(12) United States Patent
Kovie et al.

(10) Patent No.: US 11,987,107 B2
(45) Date of Patent: May 21, 2024

(54) REAR DOOR ASSEMBLY

(71) Applicant: NISSAN NORTH AMERICA, INC., Franklin, TN (US)

(72) Inventors: David Kovie, Livonia, MI (US); James Haupt, Livonia, MI (US); Christopher Herrala, Milford, MI (US); Edward Orcsik, LaSalle (CA); John Zakoff, Sterling Heights, MI (US); James Filipowski, Brighton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/965,704

(22) Filed: Oct. 13, 2022

(65) Prior Publication Data

US 2024/0123800 A1    Apr. 18, 2024

(51) Int. Cl.
*B60J 5/10*      (2006.01)
*B62D 33/027*    (2006.01)

(52) U.S. Cl.
CPC ............ *B60J 5/106* (2013.01); *B62D 33/027* (2013.01)

(58) Field of Classification Search
CPC ................................ B60J 5/106; B62D 33/027
USPC ..................................... 296/146.8, 146.12, 56
See application file for complete search history.

(56) References Cited

U.S. PATENT DOCUMENTS

| | | | |
|---|---|---|---|
| 3,713,472 A * | 1/1973 | Dozois | E05B 81/22 |
| | | | 49/40 |
| 4,620,743 A | 11/1986 | Eke | |
| 5,921,611 A | 7/1999 | Townsend | |
| 6,234,563 B1 | 5/2001 | Bascou | |
| 6,386,613 B1 | 5/2002 | Vader | |
| 6,471,284 B2 * | 10/2002 | Landmesser | B60J 5/101 |
| | | | 296/146.8 |
| 7,828,366 B2 | 11/2010 | Andre et al. | |
| 8,376,449 B2 | 2/2013 | Kitayama et al. | |
| 8,979,170 B2 * | 3/2015 | Kurita | B60Q 1/0035 |
| | | | 296/146.8 |
| 9,205,728 B1 * | 12/2015 | Alvarez Ruiz | B60J 5/107 |
| 10,569,812 B2 * | 2/2020 | Tyagi | B62D 33/037 |
| 10,626,649 B2 * | 4/2020 | Laurent | E05D 15/403 |

(Continued)

FOREIGN PATENT DOCUMENTS

| | | |
|---|---|---|
| WO | 2005080108 A1 | 9/2005 |
| WO | 2015097321 A1 | 7/2015 |

*Primary Examiner* — Jason S Morrow
(74) *Attorney, Agent, or Firm* — Global IP Counselors, LLP

(57) ABSTRACT

A rear door assembly includes a vehicle body structure, a rear door and a four-bar linkage assembly. The vehicle body structure has a roof structure and a side wall defining a rear door opening. The four-bar linkage assembly supports the rear door for movement between open and closed orientations. The four-bar linkage includes a rearward member, a support bracket and a forward member. A first end of the rearward member is pivotally attached to an upright portion of the side wall and a second end attached to the rear door. A rearward end of the support bracket is fixed to the roof structure and is cantilevered therefrom. The forward member has a first end attached to the rearward end of the support bracket and a second end attached to the rear door inboard of the rearward member. The first end of the rearward member is outboard of the support bracket.

17 Claims, 15 Drawing Sheets

(56) References Cited

U.S. PATENT DOCUMENTS

| | | | |
|---|---|---|---|
| 10,801,243 B2* | 10/2020 | Nakatomi | E05F 1/1253 |
| 2005/0046229 A1 | 3/2005 | Yamada et al. | |
| 2021/0054673 A1* | 2/2021 | Wu | B60J 5/106 |
| 2023/0241949 A1* | 8/2023 | Fuentes | E05F 15/668 |
| | | | 701/49 |

* cited by examiner

REAR DOOR ASSEMBLY

BACKGROUND

Technical Field

The present disclosure generally relates to a rear door assembly. More specifically, the present disclosure relates to a rear door assembly that includes a rear door supported by a four-bar linkage dimensioned and arranged to move the rear door along an arcuate path when moving between fully open and fully closed orientations.

Background Information

Vehicles such as sports utility vehicles (SUVs) and hatch back vehicles typically have a rear door that is attached to the vehicle with a pair of hinges. Consequently, the rear door pivots about an axis defined by the hinges. The rear door is therefore only capable of pivotal or rotational movement.

SUMMARY

One object of the present disclosure is to provide a rear door of a vehicle with linkage that moves the rear door along an arcuate path during the opening and closing processes.

Another object of the present disclosure is to provide a rear door assembly with linkage that allows a rear door to open with minimal rearward movement during the door opening process.

Another object of the present disclosure is to provide a rear door with linkage that positions at least a portion of the rear door above a roof structure of the vehicle when the rear door is in a fully open orientation.

Still another object of the present disclosure is to provide a rear door with linkage that moves the rear door to an open orientation where the rear door is positioned above and away from a rear door opening of the vehicle allowing easier access to the cargo area concealed by the rear door with the rear door in the closed orientation.

In view of the state of the known technology, one aspect of the present disclosure is to provide a rear door assembly with a vehicle body structure, a rear door and a four-bar linkage assembly. The vehicle body structure has a roof structure and a side wall that defines a rear door opening. The rear door is movable between a door closed orientation covering the rear door opening and a door open orientation exposing the rear door opening. The four-bar linkage assembly supports the rear door for movement between the door open orientation and the door closed orientation. The four-bar linkage includes at least a rearward member, a support bracket and a forward member. The rearward member has a first end pivotally attached to an upright portion of the side wall and a second end attached to the rear door. The support bracket is fixed to the roof structure (a roof ditch) with a rearward end thereof being cantilevered from the roof structure. The forward member has a first end attached to the rearward end of the support bracket and a second end attached to the rear door forward and inboard relative to the rearward member. The first end of the rearward member is outboard relative to the support bracket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
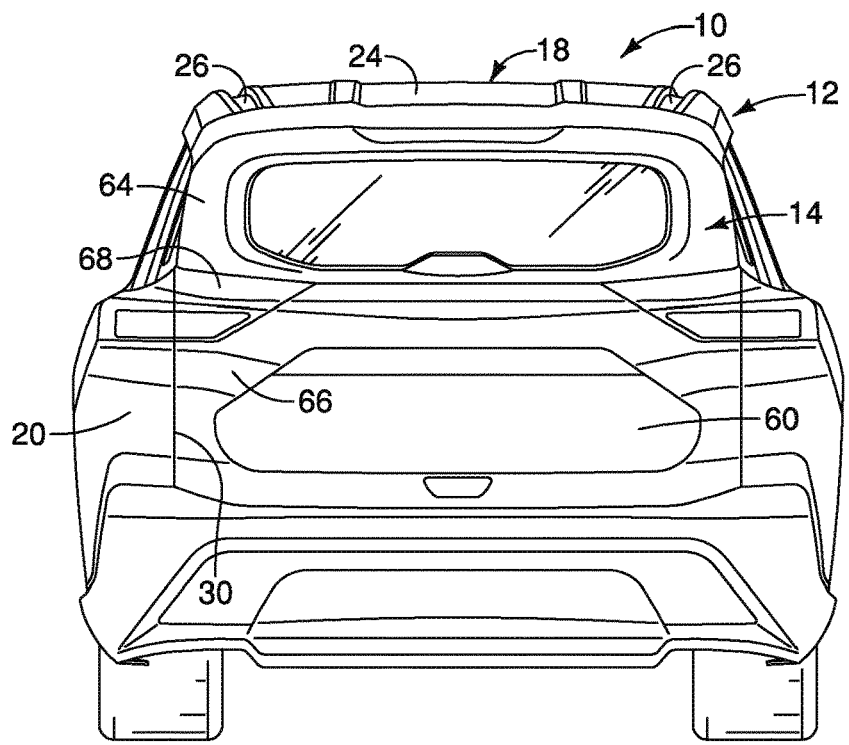
FIG. 1 is a rear view of a vehicle showing a rear door in a closed orientation in accordance with an exemplary embodiment.
Figure 2:
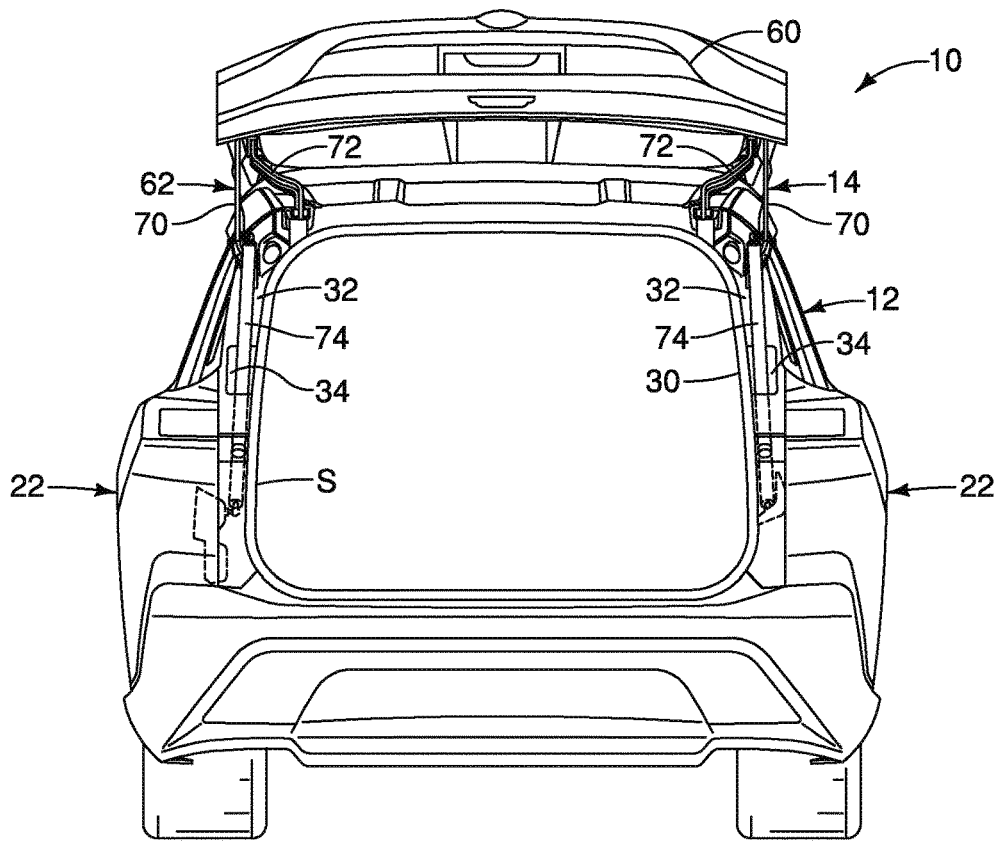
FIG. 2 is another rear view of a vehicle showing the rear door in an open orientation showing a gutter area that surrounds a rear door opening and a four-bar linkage that supports the rear door in accordance with an exemplary embodiment.

Referring initially to FIGS. 1 and 2, a vehicle 10 has a vehicle body structure 12 that includes a rear door assembly 14 is illustrated in accordance with a first embodiment.

The vehicle body structure 12 includes a roof structure 18 (also referred to as the roof 18), a rear end area 20 and a side walls 22. The rear end area 20 defines a rear door opening 30, gutter areas 32 and cavity openings 34. The rear end area 20 includes a thick flexible sealing member S that is installed thereto such that the flexible sealing member S surrounds the rear door opening 30.

The roof structure 18 includes a main panel 24 with roof ditches 26 defined at either lateral side thereof. The main panel 24 is attached to respective upper ends of the side walls 22 along the roof ditch 26 in a conventional manner. The roof ditches 26 are recessed areas or troughs that extend from the front of the roof structure 18 to the rear end area 20 at each side of the main panel 24.

The rear end area 20 can be a separate panel fixed to the panels that define the side walls 22 and the main panel 24 of the roof structure 18. Alternatively, the rear end area 20 can be formed as part of a rear end area of each of the side walls 22 and the main panel 24 of the roof structure 18. The rear end area 20 defines a rear door opening 30 and gutter areas 32 (also referred to as gutters 32).

The gutter areas 32 extend along opposite sides of the rear door opening 30 and at least partially surround the rear door opening 30, The gutter areas 32 are shaped and contoured to divert water and debris away from the rear door opening 30. Each of the gutter areas 32 further defines a cavity opening 34 that is described further below.

Each of the side walls 22 includes an inner wall 36 and an outer wall 38 (FIG. 9) with a cavity 40 defined therebetween. Each side wall 22 further defines a wheel well structure 42 proximate a lower end thereof. The cavity 40 extends from an upper area of the wheel well structure 42 upward to a corresponding one of the cavity openings 34 defined within the gutter areas 32 of the rear end panel 20.

The cavity opening 34 in the gutter areas 32 of the rear end area 20 is open to and provides access to the cavity 40. However, the cavity 40 is covered by a flexible boot 44 shown in FIG. 8. The flexible boot 44 is shown removed from the vehicle 10 in FIG. 9. The flexible boot 44 is removed in all other drawings for the sake of clarity in the description of the rear door assembly 14 below.

Figure 10:
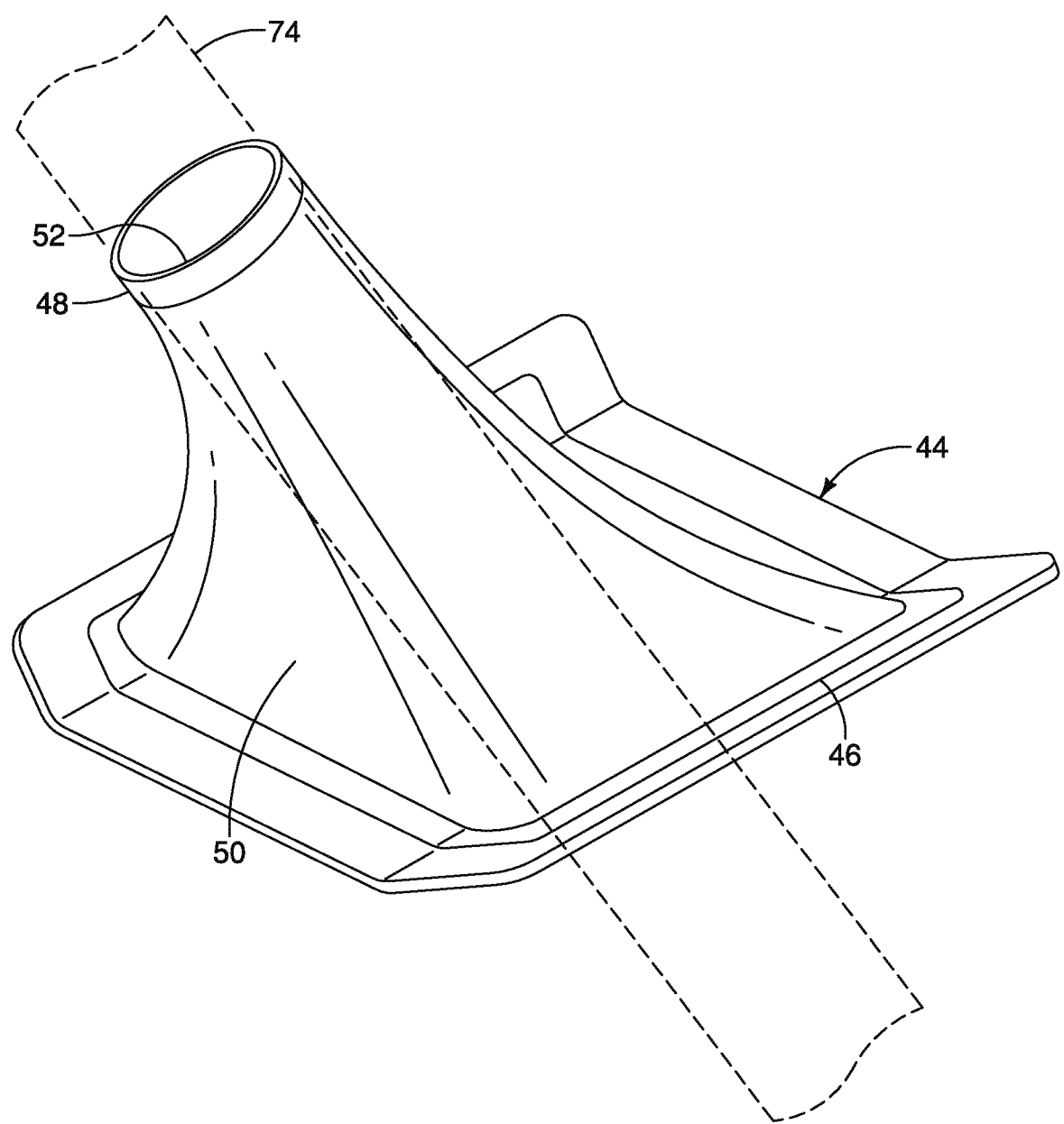
FIG. 10 is a perspective view of the flexible boot removed from the vehicle showing a circumferentially arranged attachment area dimensioned to install to the cavity opening, flexible boot section and an opening at the top of the flexible boot section with an upper opening dimensioned to receive the extender in accordance with the exemplary embodiment.

As shown in FIG. 10, the flexible boot 44 include a circumferentially arranged attachment area 46 that attaches to the gutter area 32 covering the opening 34. The flexible boot 44 also includes an upper end 48 of a boot section 50. The upper end 48 defines an opening 52 that is described in greater detail below. The circumferentially arranged attachment area 46 is dimensioned and shaped to attach to an edge of the gutter area 32 that defines and surrounds the cavity opening 34.

Figure 3:
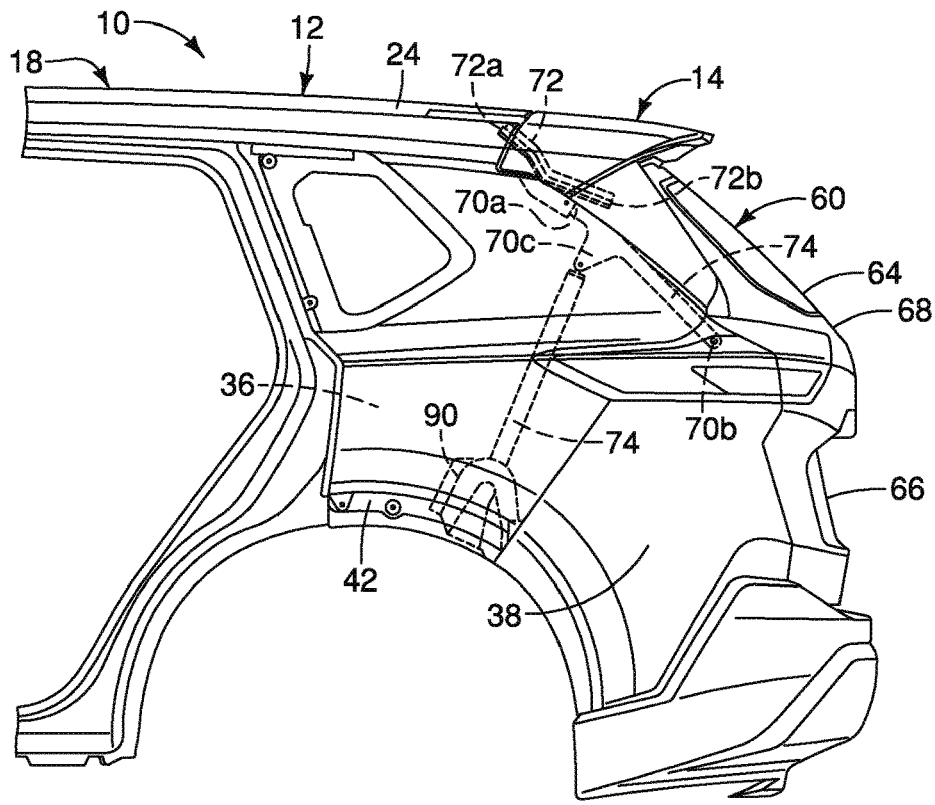
FIG. 3 is a side view of the vehicle with suspension and side doors removed for the sake of clarity, showing the rear door in the closed orientation with elements of the four-bar linkage including a rearward member, a forward member and an extender in accordance with the exemplary embodiment.
Figure 4:
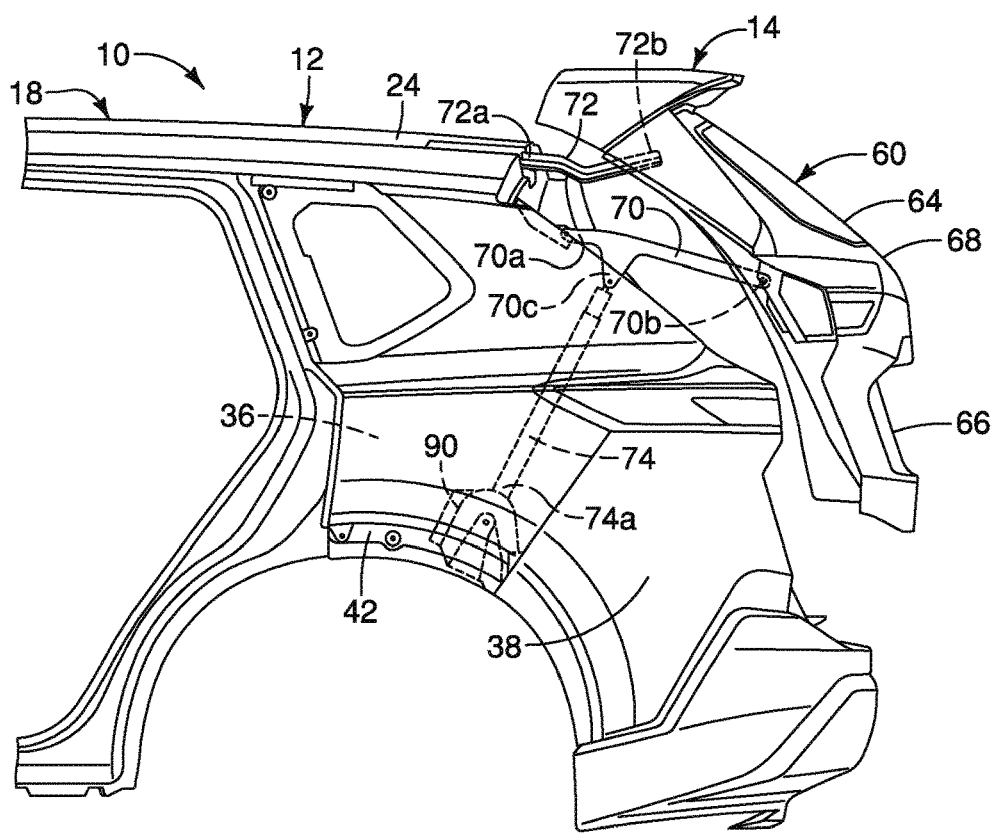
FIG. 4 is another side view of the vehicle similar to FIG. 3 showing the rear door in a first intermediate orientation just after a door opening process has started in accordance with the exemplary embodiment.
Figure 5:
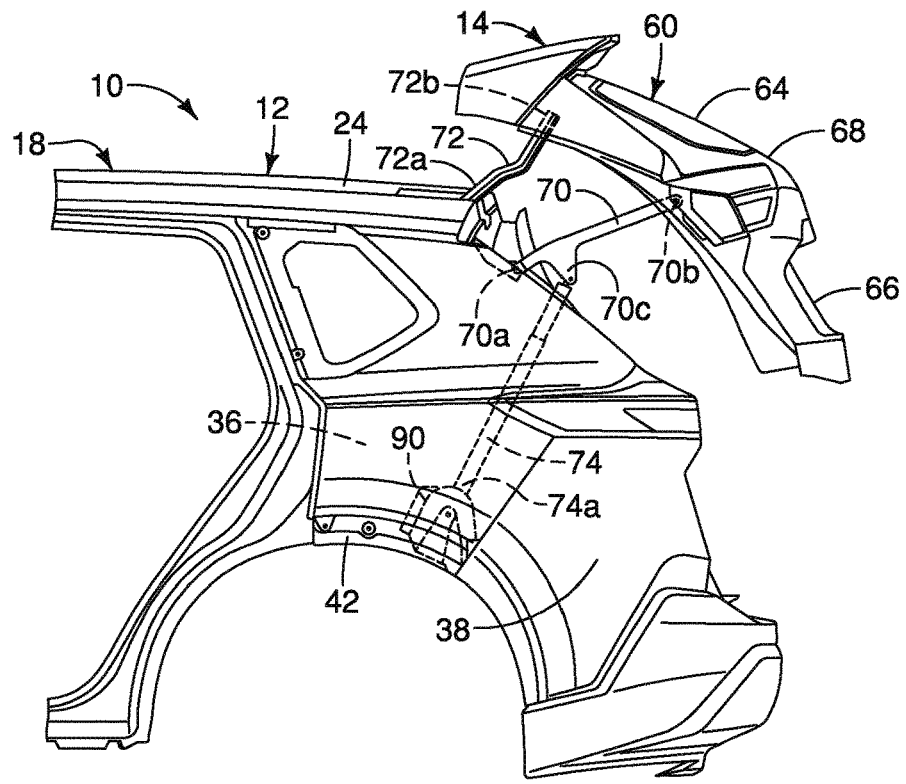
FIG. 5 is another side view of the vehicle similar to FIGS. 3 and 4 showing the rear door in a second intermediate orientation about half-way through the door opening process in accordance with the exemplary embodiment.
Figure 6:
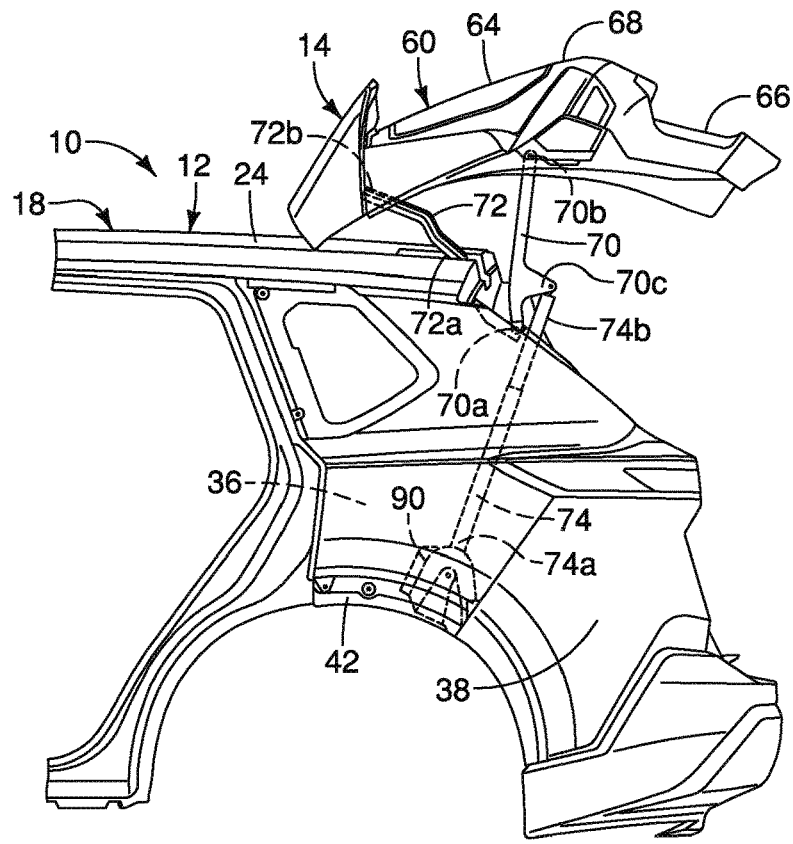
FIG. 6 is another side view of the vehicle similar to FIGS. 3-5 showing the rear door in a fully open orientation in accordance with the exemplary embodiment.

A description of the rear door assembly 14 with initial reference to FIGS. 3-6. The rear door assembly 14 includes a rear door 60 and a four-bar linkage 62. The rear door 60 is movable between a door closed orientation covering the rear door opening 30 and the gutters 32, as shown in FIGS. 1 and 3, and a door open orientation exposing the rear door opening 30 and the gutters 32, as shown in FIGS. 2 and 6. FIG. 4 shows a first intermediate orientation of the rear door 60 as the rear door 60 is moved away from the door closed orientation (FIGS. 1 and 3). FIG. 5 shows a second intermediate orientation of the rear door 60 as the rear door 60 is toward the door open orientation (FIGS. 2 and 6).

As shown in FIG. 1, with the rear door 60 in a door closed orientation, the rear door 60 covers and at least partially conceals a cargo area at the rear of the vehicle body structure 12. As shown in FIG. 2, with the rear door 60 in a door open orientation, the rear door 60 exposes and allows easy access to the cargo area at the rear of the vehicle body structure 12.

As viewed from the side as shown in FIGS. 3-6, the rear door 60 has an overall curved shape. The rear door 60 an upper area 64 (also referred to as a window supporting area 64) and a lower area 66. A central area 68 of the rear door 60 is defined proximate a bottom of the window supporting area 64. The upper area 64 of the rear door 60 also defines outboard upper corners 64a.

The four-bar linkage assembly 62 supports the rear door 60 for kinematic movement between the closed orientation and the open orientation such that with the rear door 60 in the open orientation (FIGS. 2 and 6) the rear door 60 is located even with or forward of the rearward most area of a bumper fascia 78 of the vehicle 10.

The four-bar linkage assembly 62 includes a pair of rearward members 70, a pair of forward members 72 and a pair of extenders 74. The pairs of rearward members 70, the forward members 72 and the extenders 74 are identical mirror image's (symmetrically) of one another having the same geometric configuration but on opposite sides of the vehicle 10. In other words, on a driver's side of the vehicle, there is one rearward member 70, one forward member 72 and one extender 74 (a first set). On the passenger's side of the vehicle there is one rearward member 70, one forward member 72 and one extender 74 (the second set). The first and second sets are identical to one another except that they are mirror images of one another. Similarly, the side wall 22 on one side of the vehicle 10 is identical (but mirror image) of the other side wall 22 on the other side of the vehicle 10. As well, the roof ditches 26 are identical but mirror images of one another. Therefore, with respect to the elements of the four-bar linkage assembly 62, the roof ditch 26 and the side walls 22, description of one element of the four-bar linkage assembly 62, the roof ditch 26 and the side walls 22 applies equally to the element on the opposite side of the vehicle 10.

As shown in FIGS. 4-9 and 17-21, the rearward member 70 has a first end 70a pivotally attached to the gutter 32 (on the same side of the vehicle 10), a second end 70b attached to the rear door 60 proximate the central area 68 and a protrusion 70c spaced apart from the first end 70a and the second end 70b.

Figure 12:
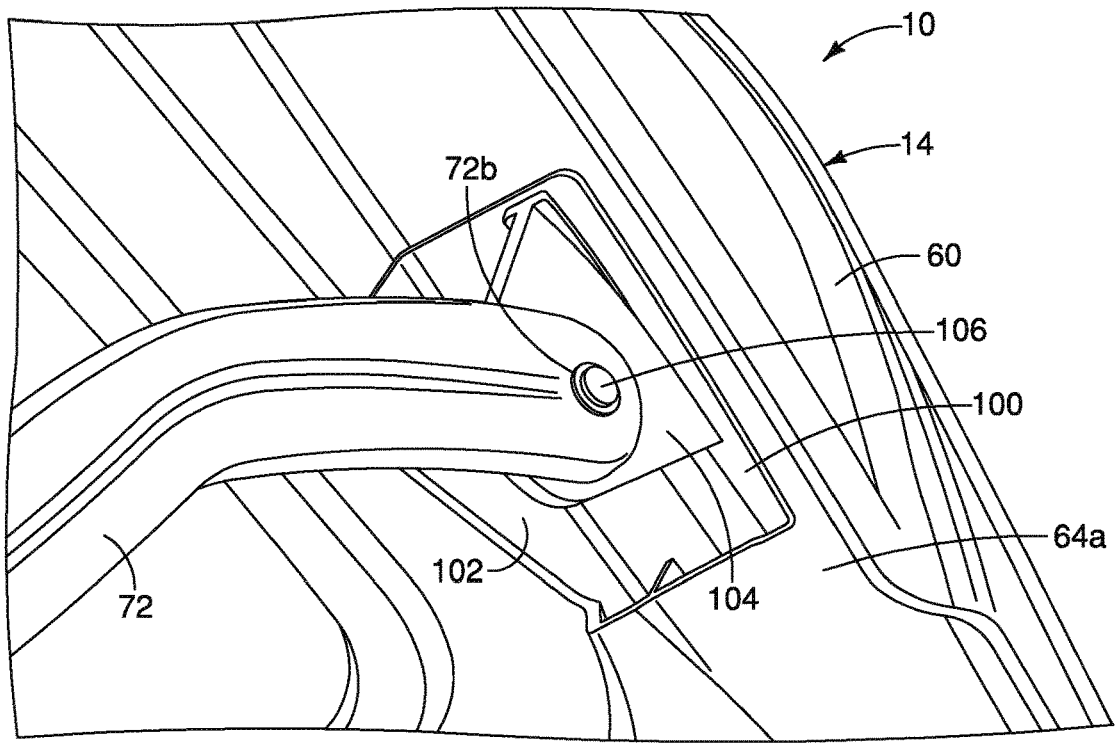
FIG. 12 is a bottom perspective view of the rear door with the rear door in the open orientation showing a bracket welded to the rear door, the bracket connected to and supporting the second end of the forward member in accordance with the exemplary embodiment.
Figure 13:
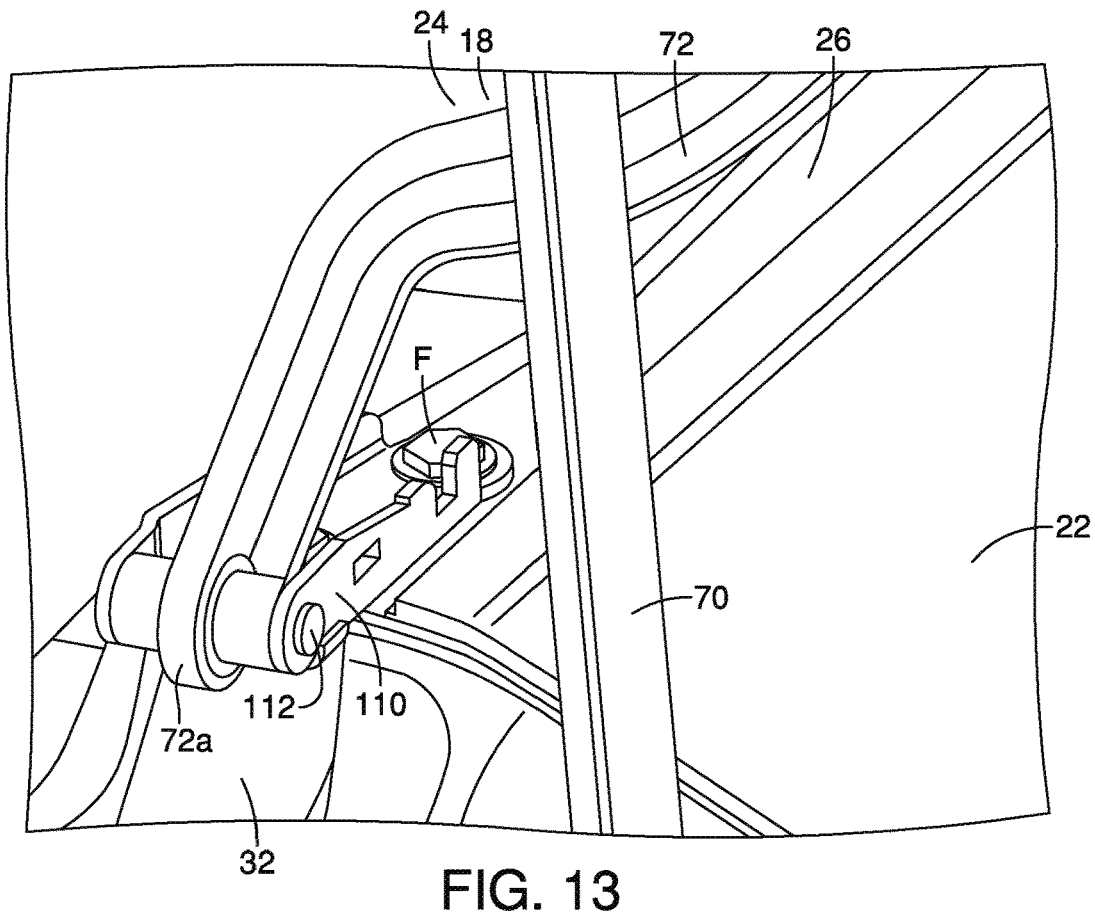
FIG. 13 is a perspective view of a roof ditch of the roof structure of the vehicle showing yet another bracket attached to the roof structure within the roof ditch, a rearward portion of the bracket being cantilevered rearward from the roof ditch, the rearward portion of the bracket supporting a second end of the forward bracket in accordance with the exemplary embodiment.
Figure 14:
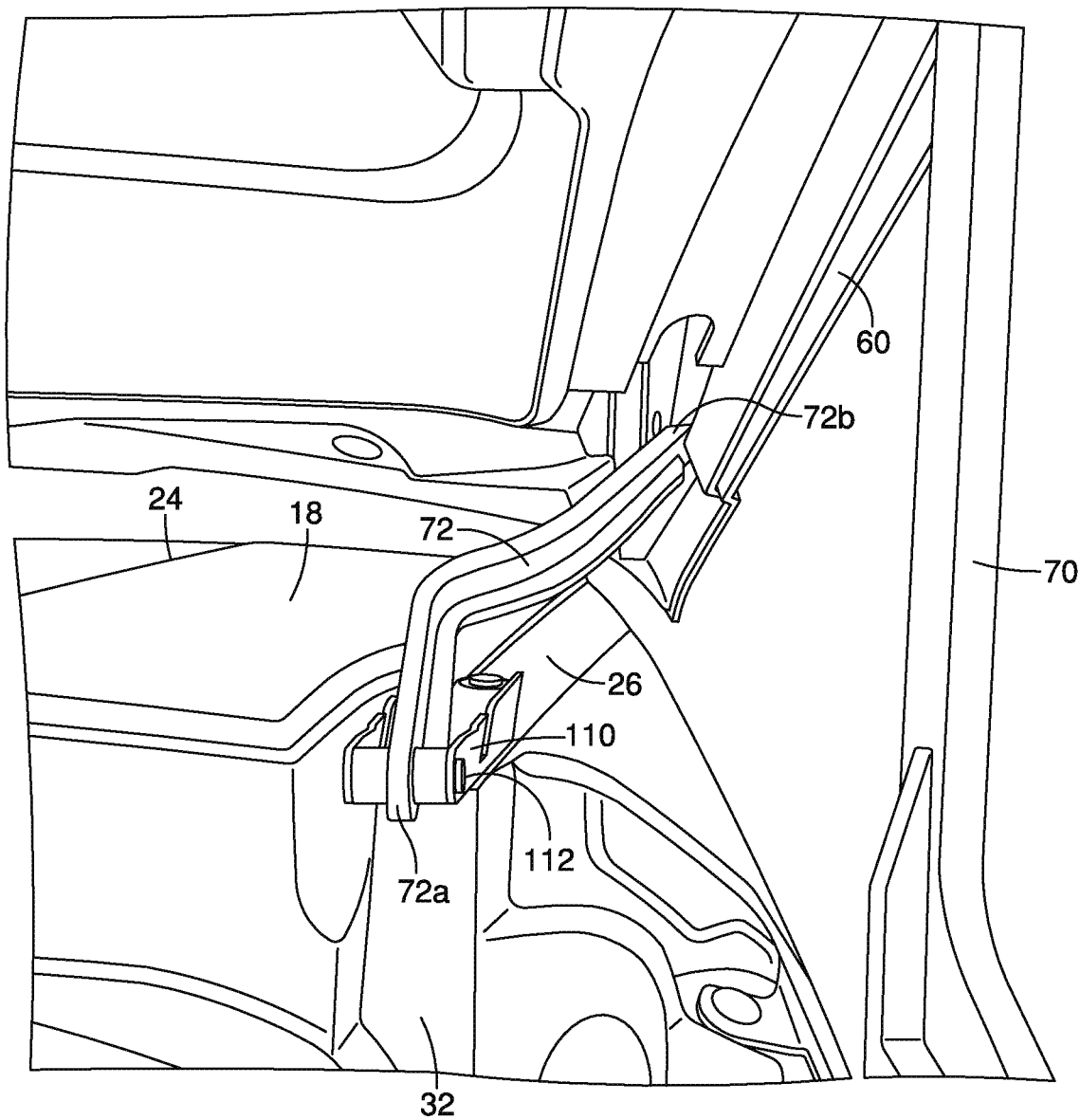
FIG. 14 is a rear perspective view of the roof ditch of the roof structure of the vehicle showing the bracket attached to the roof structure within the roof ditch, the rearward portion of the bracket cantilevered rearward from the roof ditch, the rearward portion of the bracket supporting the second end of the forward bracket in accordance with the exemplary embodiment.
Figure 15:
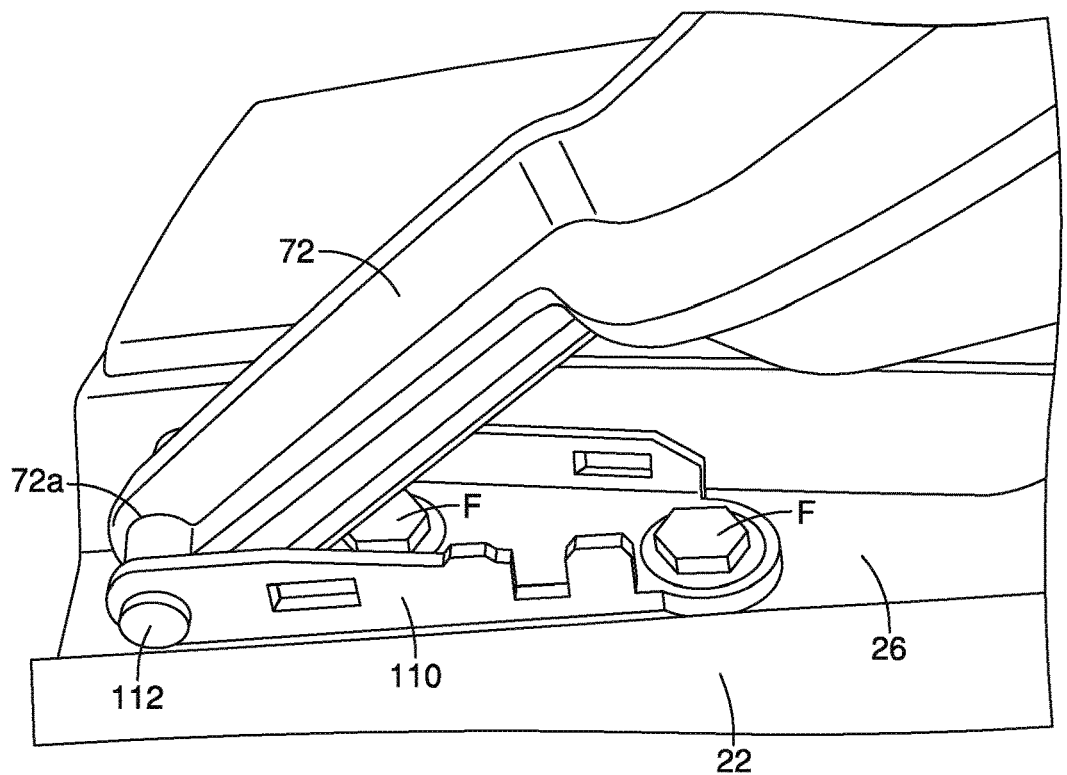
FIG. 15 is a side perspective view of the bracket attached to the roof structure within the roof ditch supporting and being pivotally connected to the second end of the forward bracket in accordance with the exemplary embodiment.
Figure 16:
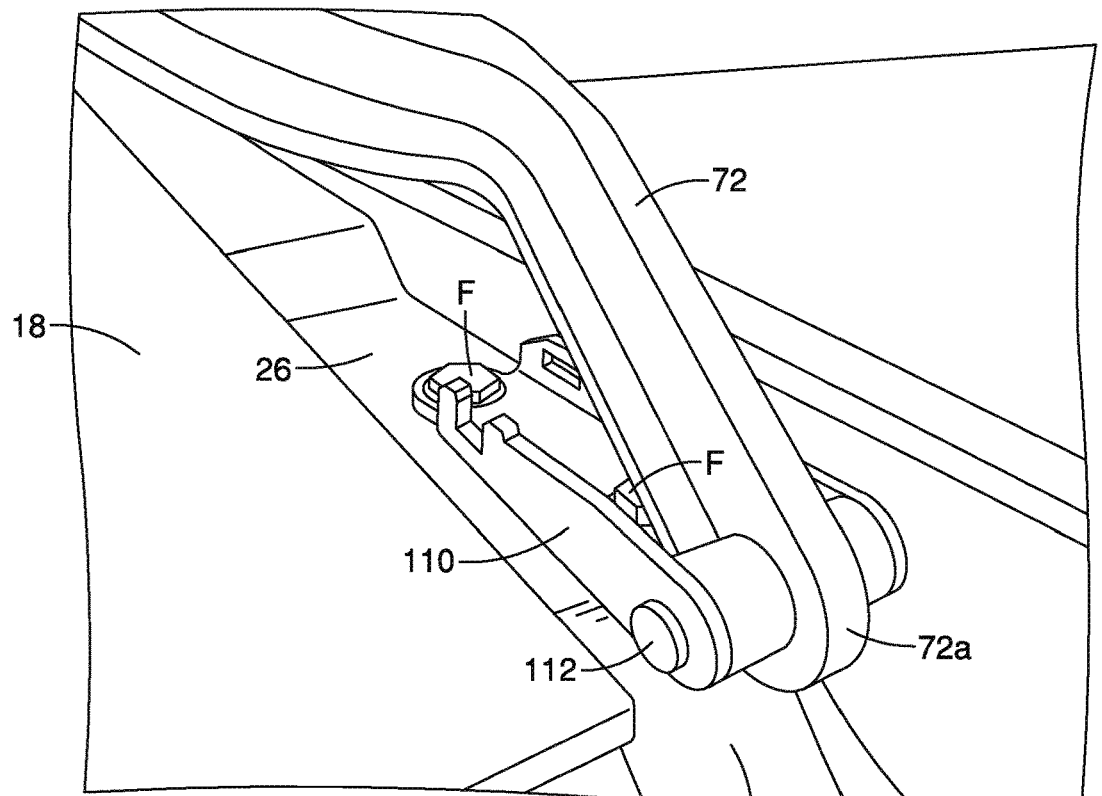
FIG. 16 is another rear perspective view of the bracket attached to the roof structure within the roof ditch supporting and being pivotally connected to the second end of the forward bracket in accordance with the exemplary embodiment.

As shown in FIGS. 4-7, 12-14 and 18-20, the forward member 72 has a first end 72a attached to roof ditch 26 of the roof structure 12 and a second end 72b attached to the upper corner 64a of the rear door 60, as shown in FIG. 12.

As shown in FIGS. 3-9, 11, 17-19 and 21-22, the extender 74 has a lower end 74a pivotally attached to a body panel (the inner wall 36 of the side wall 22) above and adjacent to the wheel well structure 42 and an upper end 74b attached to the protrusion 70c of the rearward member 70.

With the rear door 60 in the door open orientation (FIGS. 2 and 6) the rearward member 70 and the forward member 72 support the rear door 60 at a location such that most or all of the upper area 64 of the rear door 60 is directly above the roof structure 18. Further, in the open orientation (FIGS. 2 and 6) the bottom edge of the rear door 60 is located even with or forward of the rearward most area of a bumper fascia 78 of the vehicle 10.

With the rear door 60 in the door closed orientation (FIGS. 1 and 3), the rearward member 70 and the forward member 72 are located within the gutter 32 and are concealed by the rear door 60.

A description of specific elements of the four-bar linkage 62 is now provided with specific reference to FIGS. 7-23.

Figure 7:
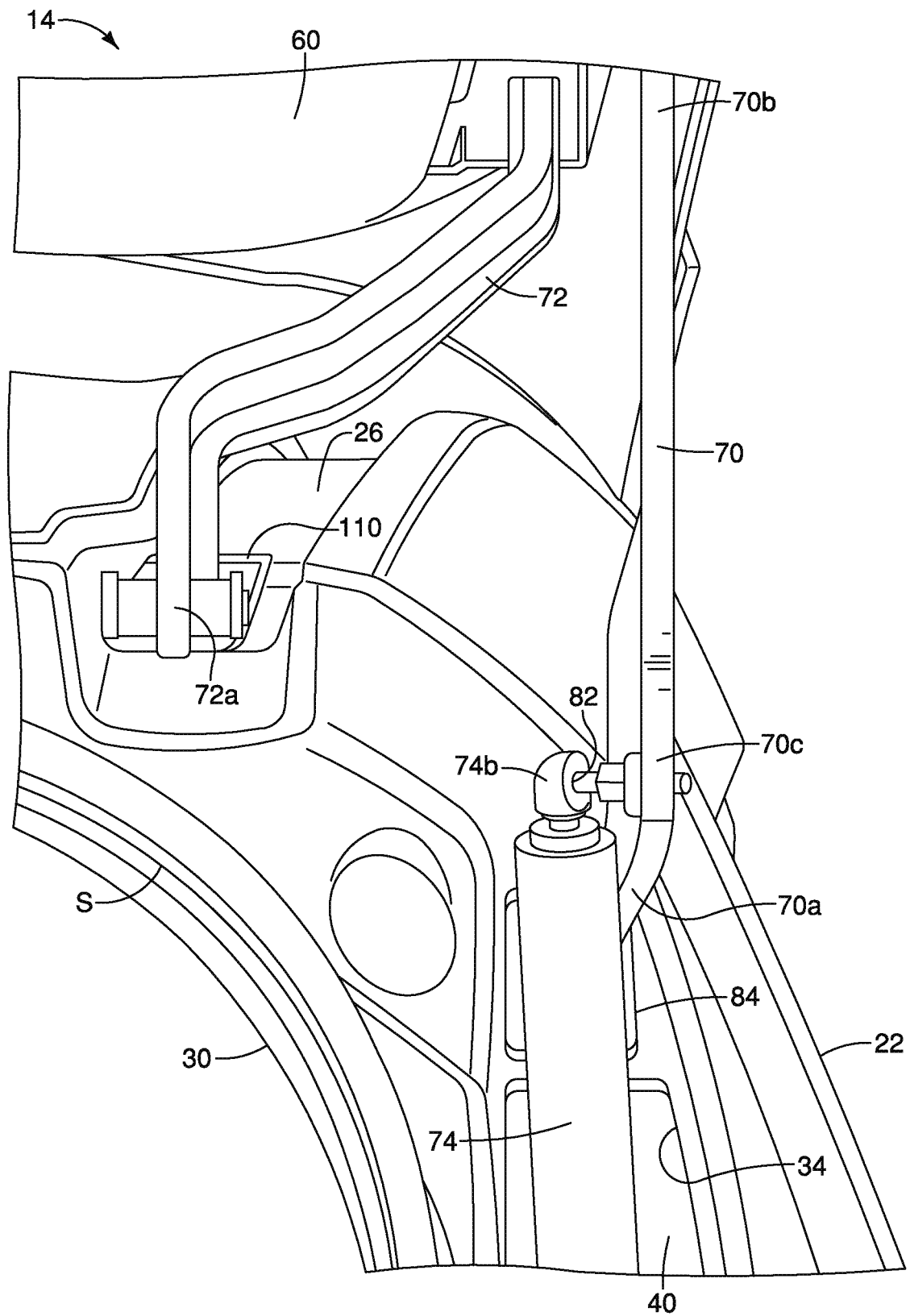
FIG. 7 is a rear view of a first side of the vehicle showing a cavity opening in the gutter area with the extender extending upward through the cavity opening with an upper end of the extender being connected to a projection of the rearward member of the four-bar linkage and also showing a bracket (a support member) attached to the roof structure within a roof ditch, a rearward end of the bracket pivotally supporting a first end of the forward member of the four-bar linkage in accordance with the exemplary embodiment.
Figure 8:
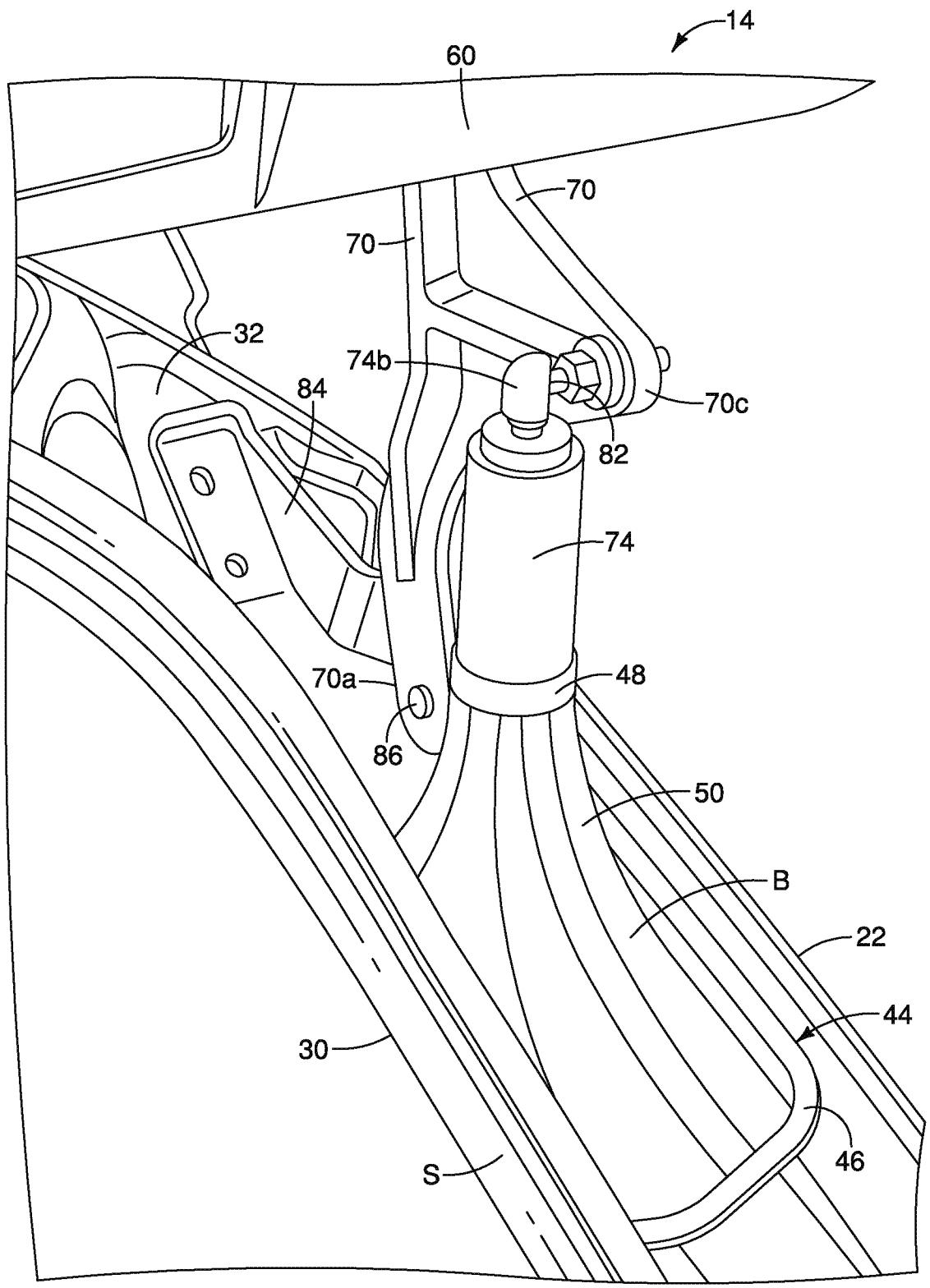
FIG. 8 is a rear perspective view of the first side of the vehicle depicted in FIG. 7 from a different angle showing a flexible boot covering the cavity opening with the extender extending upward through an opening at the top of the flexible boot, the upper end of the extender being connected to the projection of the rearward member of the four-bar linkage and also showing another bracket attached to the gutter area forward of and adjacent to the cavity opening, the another bracket pivotally supporting a first end of the rearward member in accordance with the exemplary embodiment.
Figure 9:
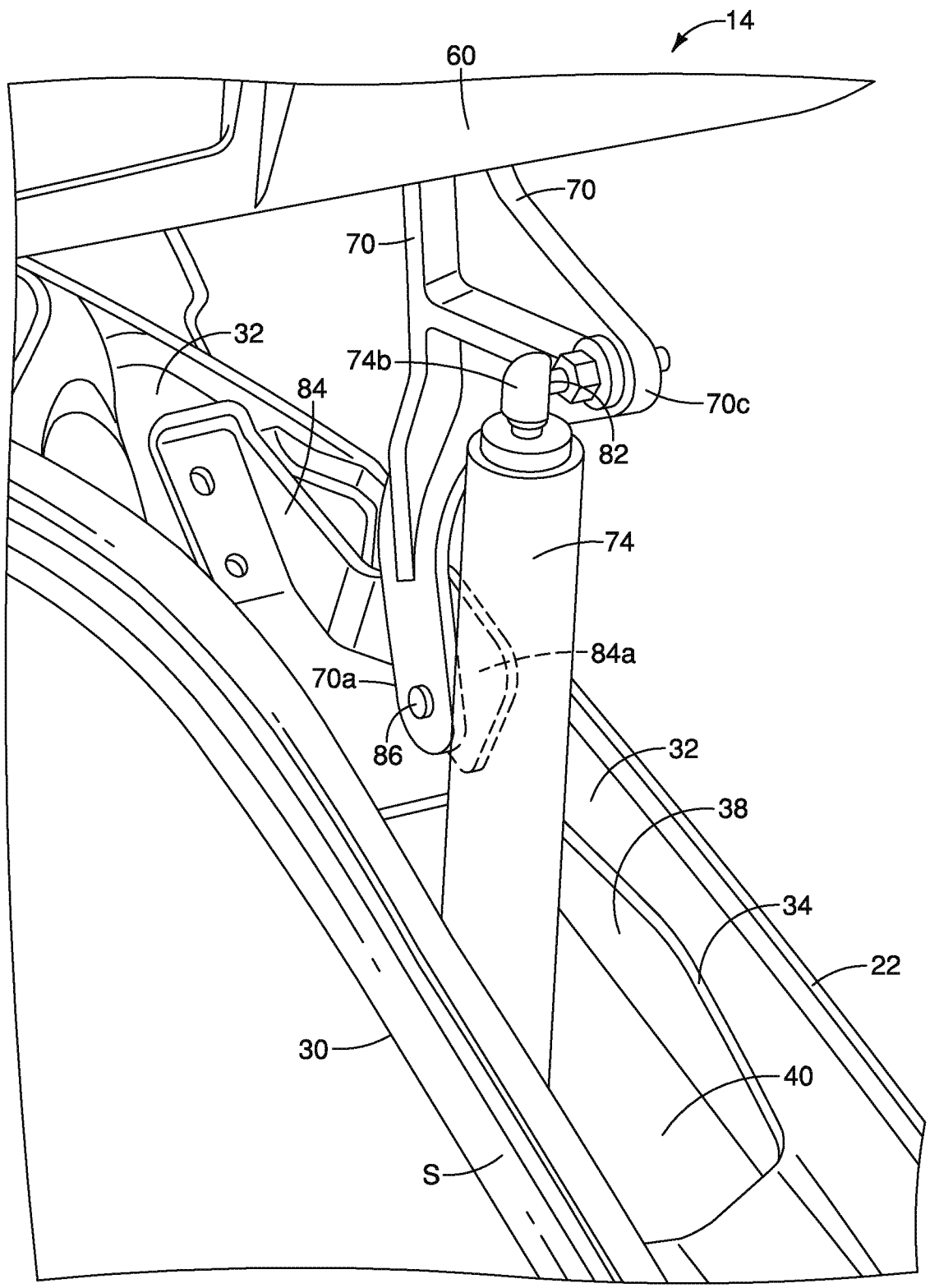
FIG. 9 is another rear perspective view of the first side of the vehicle from the same perspective angle as FIG. 8 showing the cavity opening in the gutter area with the flexible boot removed to show the extender extending upward through the cavity opening, the upper end of the extender being connected to the projection of the rearward member of the four-bar linkage and also showing the another bracket attached to the gutter area forward of and adjacent to the cavity opening in accordance with the exemplary embodiment.

As shown in FIGS. 7 and 9, the upper end 74b of the extender 74 connects to the protrusion 70c of the rearward member 70 via a ball joint 82. As shown in FIG. 8, the extender 74 extends downward through the opening 52 in the flexible boot 44, through the cavity opening 34 and into the cavity 40 (see FIG. 9 with the boot 44 removed).

Figure 21:
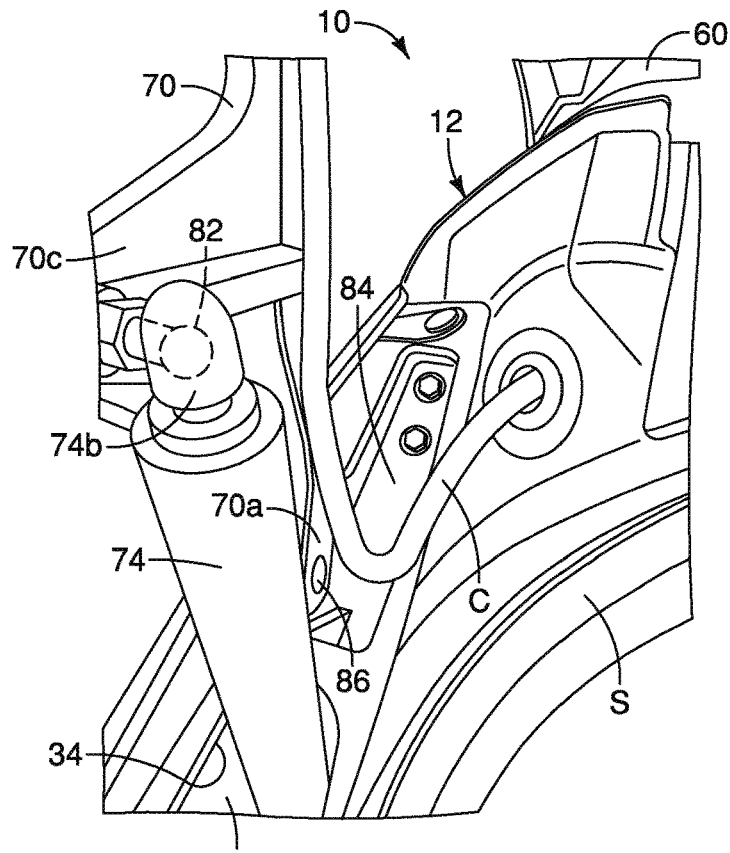
FIG. 21 is another rear perspective view of the rear door in the fully open orientation showing the extender pivotally attached to the protrusion of the rearward member, the first end of the rearward member of the four-bar linkage pivotally attached to the bracket fixed to the gutter area of the vehicle, and the cable in accordance with the exemplary embodiment.
Figure 22:
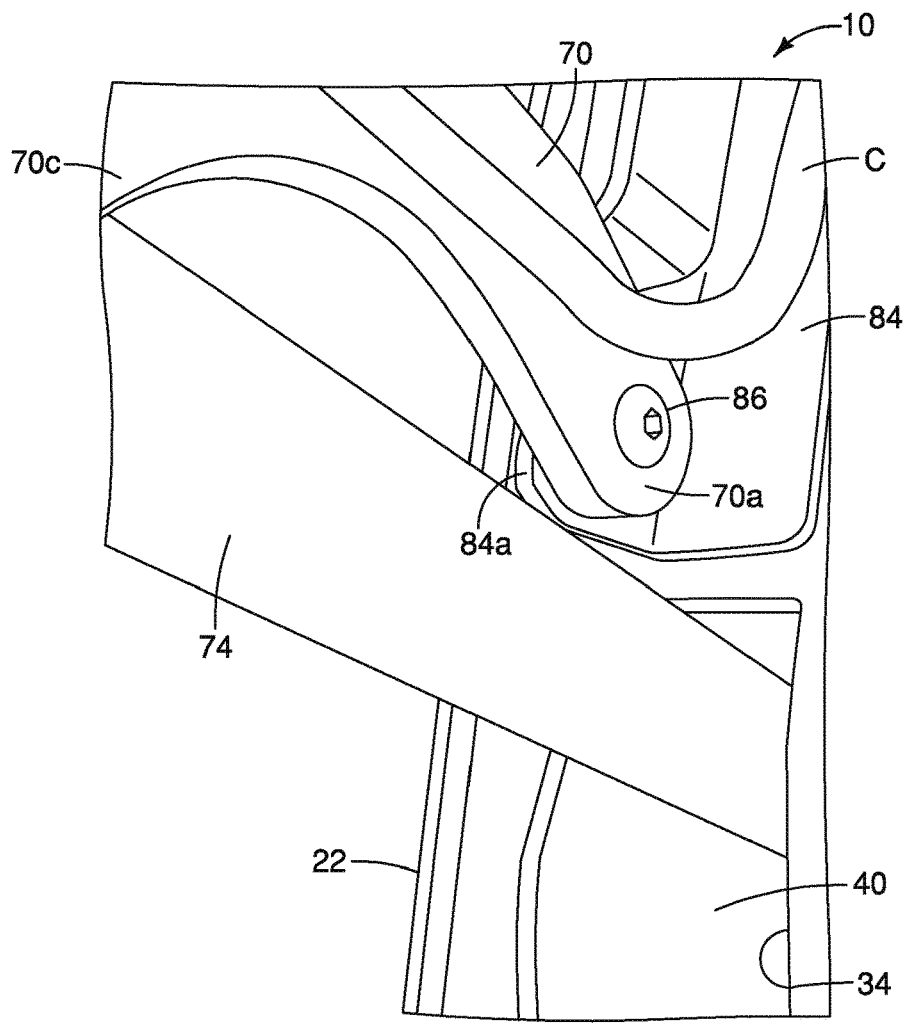
FIG. 22 is a upper perspective view of the gutter area of the rear of the vehicle looking down into the cavity showing the extends extending through the cavity opening and into the cavity and the first end of the rearward member of the four-bar linkage attached to the bracket fixed to the gutter area in accordance with the exemplary embodiment.

As shown in FIGS. 8 and 9, the first end 70a of the rearward member 70 is attached to the gutter area 32 via a bracket 84. The bracket 84 is bolted to the gutter area 32 thereby fixedly attaching the bracket 84 in position. Further the first end 70a is pivotable about a pivot pin 86 that extends through the first end 70a of the rearward member 70 and through a flange 84a of the bracket 84. The bracket 84 and flange 84a are also shown in FIGS. 21 and 22 (on the opposite of the vehicle 10). A description of the attachment of the second end 70b is provided below.

Figure 11:
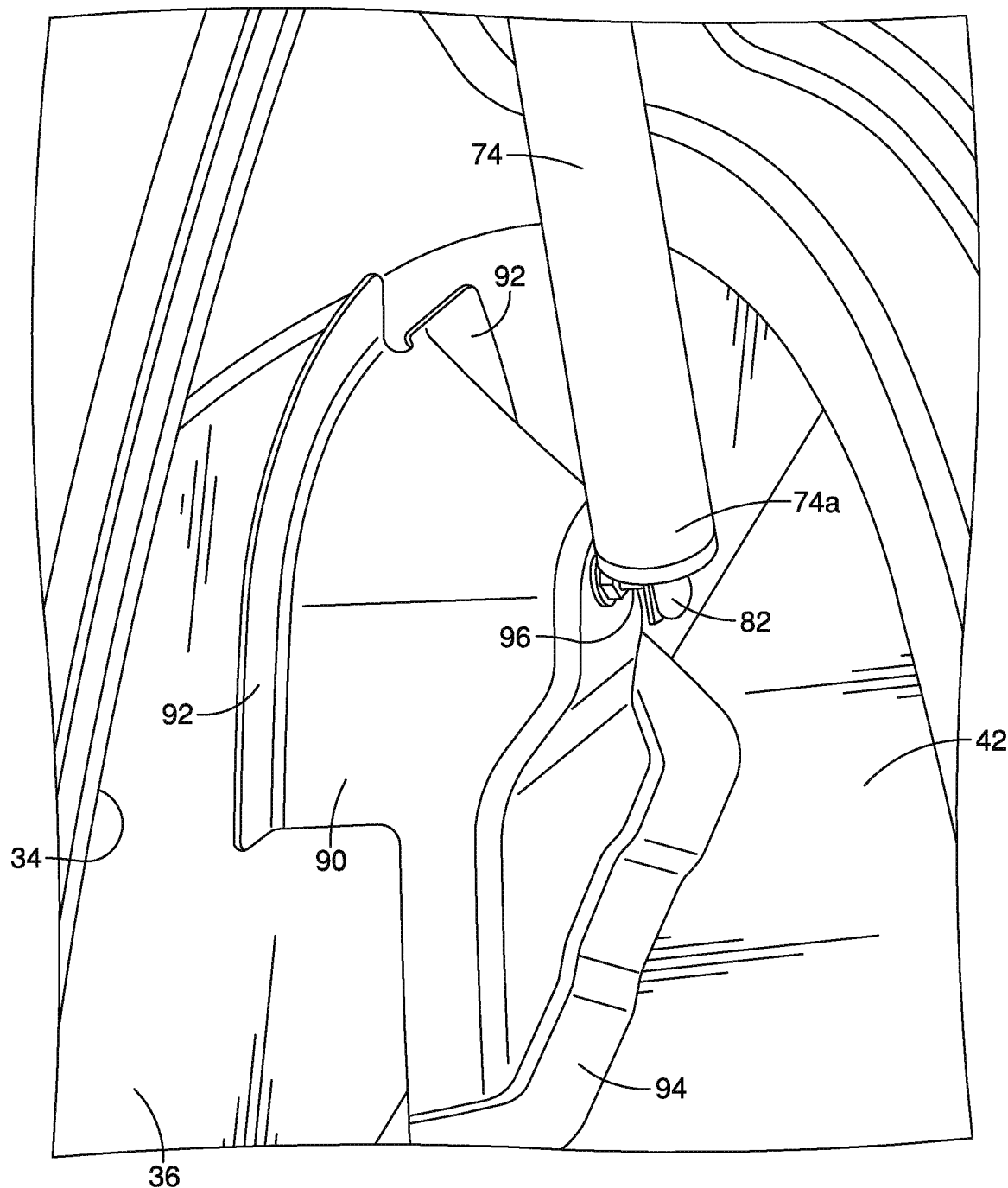
FIG. 11 is a view of the cavity in the side walls with the gutter area removed in order to show an upper area of a wheel well structure and an inner or inboard side wall with a bracket welded to both the wheel well structure and the inner side wall, the bracket being attached to and supporting the lower end of the extender in accordance with the exemplary embodiment.

FIG. 11 shows the inner wall 36 of the side walls 22 within the cavity 40 with the gutter area 32 removed for clarity. As shown in FIG. 11 within the cavity 40, a bracket 90 is installed to the inner wall 36 and the wheel well structure 42. Specifically, the bracket 90 includes a wall flange 92 and a well flange 94. The wall flange 92 is welded to the inner wall 36 and the well flange 94 is welded to an upper surface of the wheel well structure 42. The bracket 90 has a contoured and curved shapes that mate with the corresponding adjacent surfaces of the inner wall 36 and the wheel well structure 42.

The bracket 90 includes a fitting 96 that attaches to another ball joint 82 that attached to the lower end 74a of the extender 74. Thus, the lower end 74a is pivotally fixed via the ball joint 82 to the wheel well structure 42 and the inner wall 36 of the side wall structure 22 within the cavity 40.

As shown in FIGS. 3-6, 12 and 18-19, the second end 72b of the forward member 72 is attached to the rear door 60 via a bracket 100. The bracket 100 is fixed to the rear door 60 proximate an upper end of the window of the upper area 64 of the rear door 60.

The bracket 100 includes an inboard flange 102 and a second flange 104 that are perpendicular to the main portion of the bracket 100. The main portion of the bracket 100 can be attached via fasteners to the rear door 60. However, in the depicted embodiment, the bracket 100 is welded to the rear door 60. The inboard flange 102 that abuts an adjacent surface of the rear door 60 and is welded thereto. The second flange 104 is parallel to and spaced apart from the inboard flange 102. A pivot pin 106 extends through an opening (not shown) in the second flange 104 and an opening in the second end 72b of the forward member 72. Thus, the forward member 72 is attached to the rear door 60 for pivotal movement with respect thereto about the pivot pin 106.

As shown in FIGS. 3-6, 13-16 and 19 the first end 72a of the forward member 72 is fixed to the roof ditch 26 via a bracket 110. More specifically, the bracket 110 overlays a rearward portion of the roof ditch 26 and is bolted thereto via a pair of fasteners F. A rearward end of the bracket 110 extends rearward past a rearward end of the roof ditch 26 such that the rearward end of the bracket 110 is cantilevered rearward extending over an upper area of the adjacent gutter area 32. The rearward end of the bracket 110 also includes a pivot pin 112 that extends through an opening (not shown) in the first end 72a of the forward member 72. Thus, the forward member 72 is attached to the roof ditch 26 for pivotal movement with respect thereto about the pivot pin 112.

Figure 17:
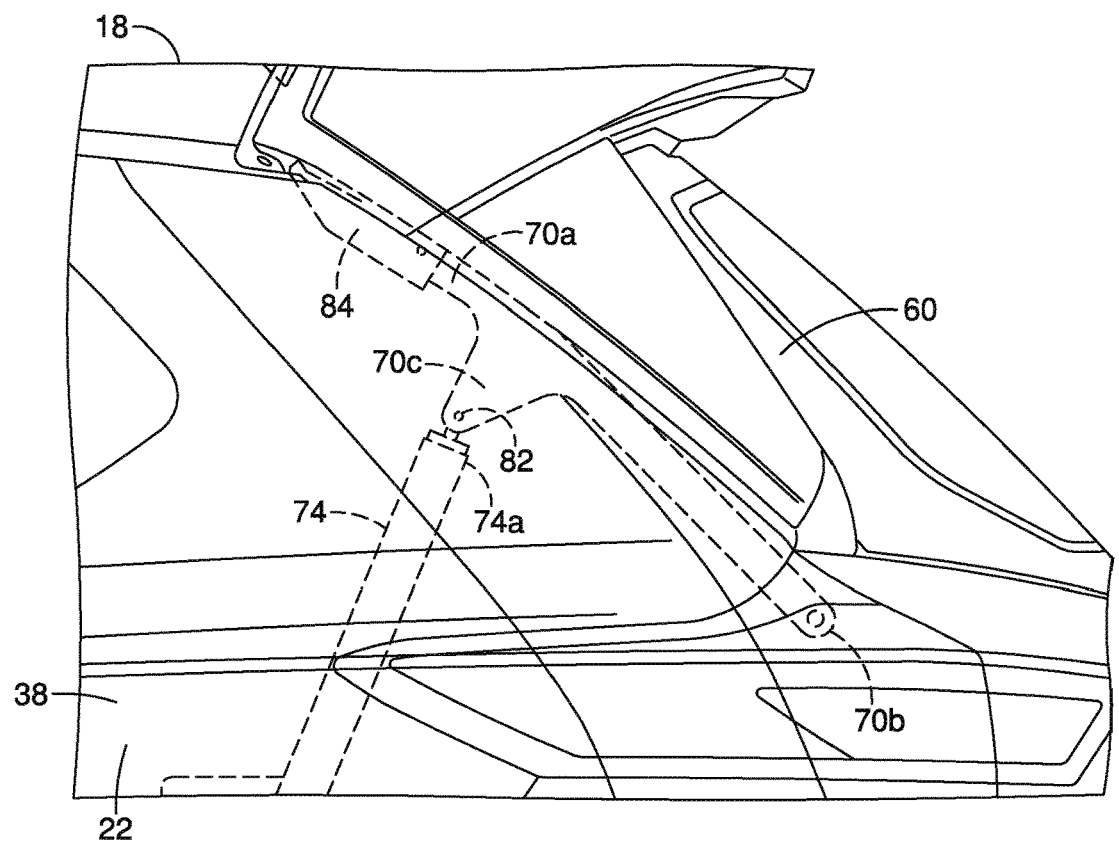
FIG. 17 is a side view of the rearward area of the vehicle showing the rearward member and the forward member of the four-bar linkage in phantom along with the extender in accordance with the exemplar embodiment.
Figure 18:
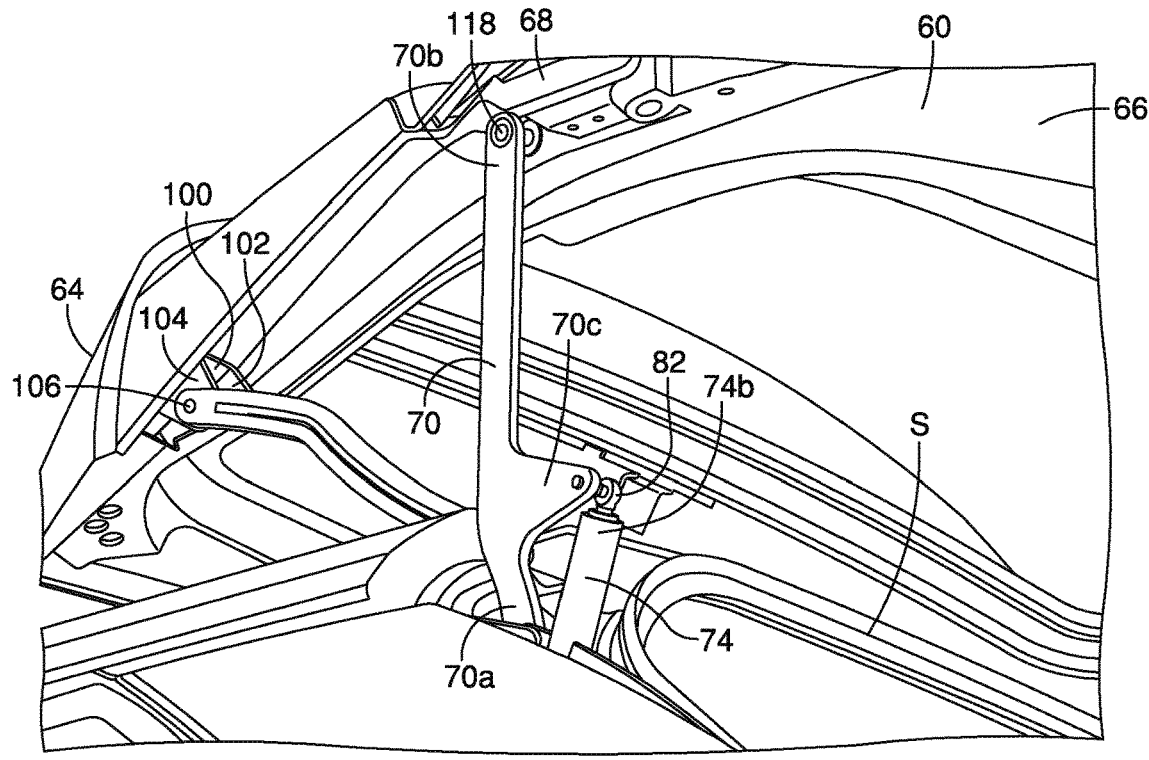
FIG. 18 is a rear perspective view of the rear door in the fully open orientation showing the second end of the rearward member of the four-bar linkage pivotally attached to one side of the central area of the rear door, the extender pivotally attached to the protrusion of the rearward member and the second end of the forward member pivotally attached to the bracket welded to the upper area of the rear door in accordance with the exemplary embodiment.
Figure 19:
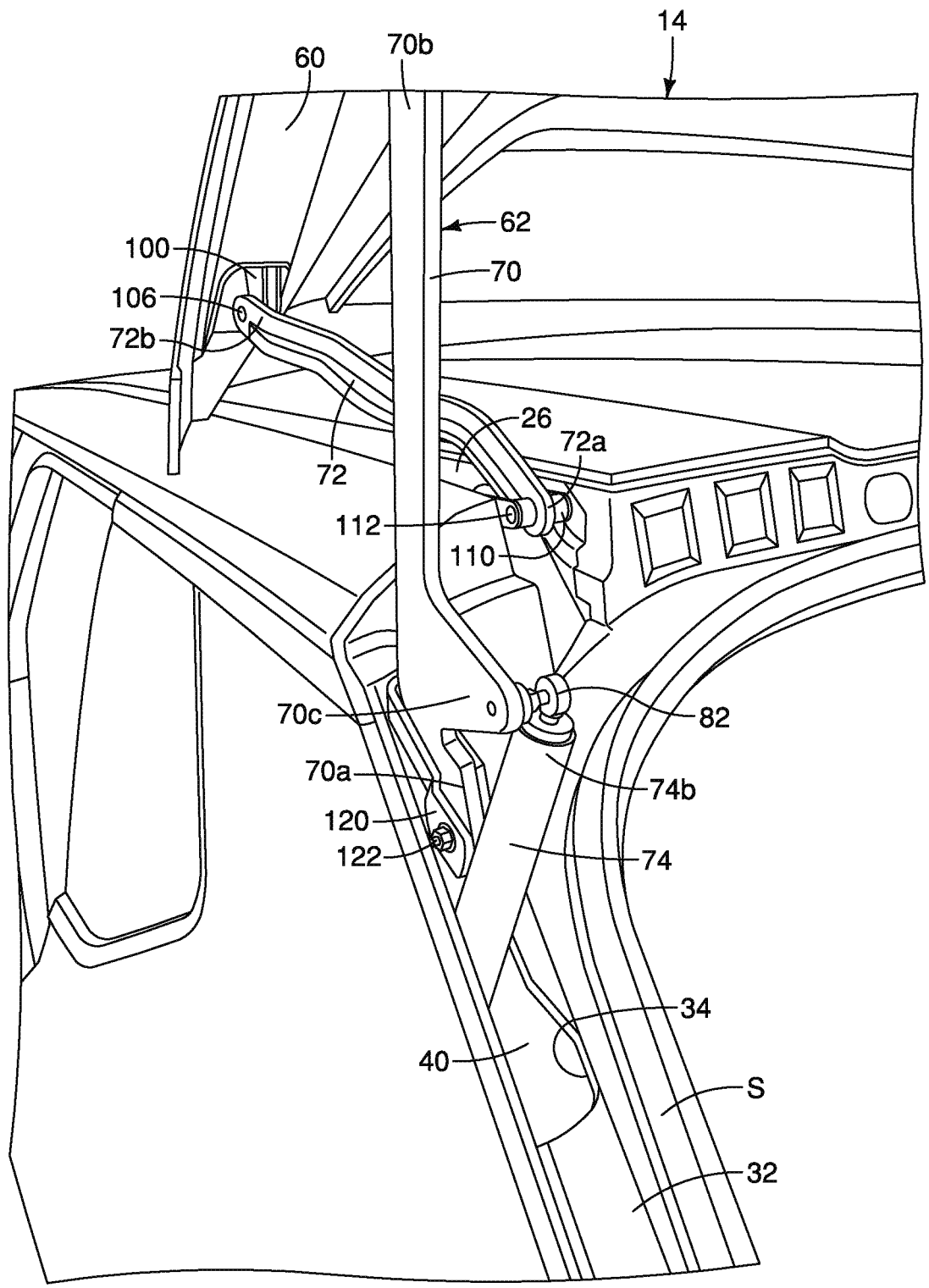
FIG. 19 is another rear perspective view of the rear door in the tally open orientation showing the first end of the rearward member of the four-bar linkage pivotally attached to the bracket fixed to the gutter area of the vehicle, the extender pivotally attached to the protrusion of the rearward member and the second end of the forward member pivotally attached to the bracket welded to the upper area of the rear door in accordance with the exemplary embodiment.

As shown in FIG. 17, with the rear door 60 in the closed orientation, the rearward member 70 is concealed by the rear door 60 and positioned along-side the surface of the adjacent gutter area 32, As is also shown in FIG. 17, the extender 74 in its entirety is located within the cavity 40. Further the protrusion 70c of the rearward member 70 protrudes into the cavity opening 34.

As shown in FIGS. 3-6 and 18-20, the second end 70b of the rearward member 70 is pivotally attached to the rear door 60 via a pivot pin 118. The pivot pin 118 includes a threaded portion (not shown) and a bearing portion (not shown). The threaded portion screws directly into one side of the central area 68 of the rear door 60 proximate a lower end of the window in the rear door 60 (relative to the rear door 60 being in the closed orientation). The second end 70b includes an opening (not shown) with the pivot pin 118 extending there through such that the bearing portion of the pivot pin 118 contacts a corresponding bearing surface (not shown) within the opening (not shown) of the second end 70b. Thus, the rearward member 70 pivots freely relative to the rear door 60.

Figure 20:
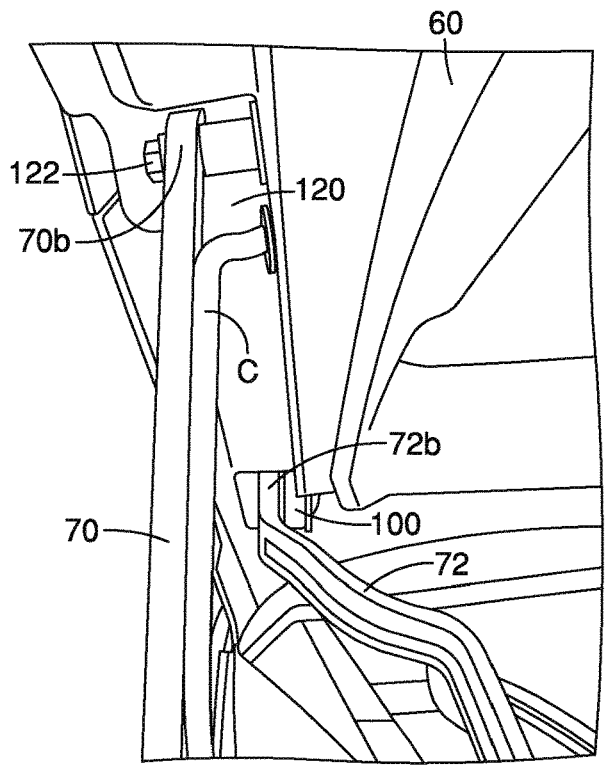
FIG. 20 is a rear view of the rear door in the fully open orientation showing the second end of the rearward member of the four-bar linkage pivotally attached to one side of the central area of the rear door, the second end of the forward member pivotally attached to the bracket welded to the upper area of the rear door and the extender pivotally attached to the protrusion of the rearward member with an electrical cable being secured to the rearward member in accordance with the exemplary embodiment.

As is also shown in FIGS. 21 and 22, on one side of the vehicle 10, a cable C includes multiple wires provide power and connectivity to lights and a camera installed to the rear door 60. The cable C connects the lights and the camera to other component in the vehicle 10. The cable C extends out of the vehicle body structure 12 and into the rear door 60 adjacent to the pivot pin 122, as shown in FIGS. 20 and 21. The cable C is secured by straps (not shown) to a portion of the rearward member 70 of the four-bar linkage 62 such that the cable C extends along the corresponding portion of the rearward member 70.

As exemplified in FIGS. 3-6 and FIGS. 17-19, the extender 74 is dimensioned and shaped such that with the rear door 60 in the door open orientation (FIGS. 2, 6 and 17-19, at least a portion of the extender 74 extends upward out of the cavity 40. With the rear door 60 in the door closed orientation (FIGS. 2-3 and 17), the extender 74 is retained completely within the cavity 40.

The extender 74 is basically a motorized linear movement device powered by, for example, an electric motor. Alternatively, the extender 74 can be a hydraulically controlled device. The extender 74 is a conventional linear movement device that is configured to move the rear door 60 from the door closed orientation to the door open orientation and also move the rear door 60 from the door open orientation to the door closed orientation.

The extender 74 is operated by a variety of switches/sensors within or on the vehicle 10 or via a keyfob. For example, a sensor (not shown) beneath the bumper fascia 78 can detect motion of a foot thereby activating the extender 74 to elongate with the rear door 60 in the closed orientation or retract with the rear door 60 in the open orientation. A button on the keyfob (not shown) can also activate the extender 74 to elongate or retract. A switch (not shown) within the vehicle 10 can be operated by a passenger or a vehicle operator to elongate or retract the extender 74.

As shown in the sequence of images shown in FIGS. 3, 4, 5 and 6, when the extender 74 is operated to extend, the extender pushes on the protrusion 70c of the rearward member 70 thereby causing the second end 70b to Move upward with its movement causing pivoting movement of the first end 70a of the rearward member 70 about the pivot pin 86. In a first intermediate position shown in FIG. 4, the rear door 60 to move away from the rear end area 20 of the vehicle 10. Further extension or elongation moves the rear door 60 to a second intermediate position shown in FIG. 5 where the rear door 60 itself begins to experience angular displacement due to the presence of the forward member 72. Finally, full extension of the extender 74 causes the rearward member 70 to pivot to a near vertical position with the second end 70b being at its highest position with the rear door 60 fully opened, as shown in FIG. 6.

The closing movement of the rear door 60 is the reverse of the sequence shown in FIGS. 3-6.

Meanwhile, between the positions shown in the sequence in FIGS. 3-6, the forward member 72 pivots about the pivot pin 112 of the bracket 110 approximately 180 degrees (or more) between the door closed orientation (FIG. 3) and the door open orientation (FIG. 6). Since the overall length of the forward member 72 is shorter than the overall length of the rearward member 74, the rear door 60 has a trajectory or movement path between the door closed orientation (FIG. 3) and the door open orientation (FIG. 6) that has a curved shape. In FIG. 3 (the door closed orientation) the lower area 66 of the rear door 60 is vertical (plus or minus 5 degrees). In FIG. 6 (the fully open orientation) the lower area 66 of the rear door 60 has undergone approximately 60 degrees of angular displacement. In other words, the kinematics of the four-bar linkage 62 is such that the rear door 60 undergoes approximately 60 degrees or more of angular articulation between the door closed orientation and the open orientation. Consequently, approximately half of the rear door 60 is located directly above the roof panel 24 with the rear door 60 in the open orientation.

A simple comparison of FIGS. 3, 4, 5 and 6 shows that the rear door 60 moves along a spiral or elliptical movement path. In other words, the movement of the rear door 60 between the open orientation and closed orientation (and vis versa) does not follow a circular path but rather follows more of an elliptical path that is curved, but does not have one axis of rotation, but several axes of rotation allowing for the depicted elliptical/curved movement (curved but not circular).

Another effect of the kinematics of the four-bar linkage 62 is that when the rear door 60 is moving from the closed orientation to the open orientation, the lower end of the rear door 60 moves rearward of an imaginary vertical plan located at a rearward most point of the bumper fascia 78 by less than 8 inches and preferably only 6 inches. Consequently, a person standing only 8 inches and preferably 6 inches rearward of the imaginary vertical plane at the bumper fascia 78 will not be contacted by a bottom edge of the rear door 60 during movement of the rear door 60 to the open orientation. In the absence of the four-bar linkage 62 where a rear door pivots only about conventional door hinges, the rear door will often swing rearward of the bumper fascia by more that a foot or a foot and a half, depending upon the size of the door and the location of the hinges.

Therefore, one advantage of the rear door 60 having the four-bar linkage 62 is that less space is needed rearward of the vehicle 10 in order to open the rear door 60. In other words, the rear door 60 can open with minimal rearward movement during the door opening and closing processes.

As well, the kinematic design of the four-bar linkage 62 is such that at least the upper area 64 of the rear door 60 is located a rearward area of the main panel 24 of the roof structure 18 when the rear door 60 is in a fully open orientation, as shown in FIG. 6.

Since at least the upper area 64 of the rear door 60 is located above the roof structure 18 with the rear door 60 fully opened, the rear door opening 30 is fully exposed providing easier access to the cargo area of the vehicle 10.

In order to package (fit) the four-bar linkage 62 in the gutter area 32 with the rear door 60 in the closed orientation, the forward member 72 has a non-linear overall shape such that the second end 72*b* of the forward member 72 is located inboard relative to the second end 70*h* of the forward member 70. Further, the forward member 72 is shorter than the rearward member 70 in order to achieve the kinematic movement of the rear door 60, as shown in FIGS. 3-6.

Figure 23:
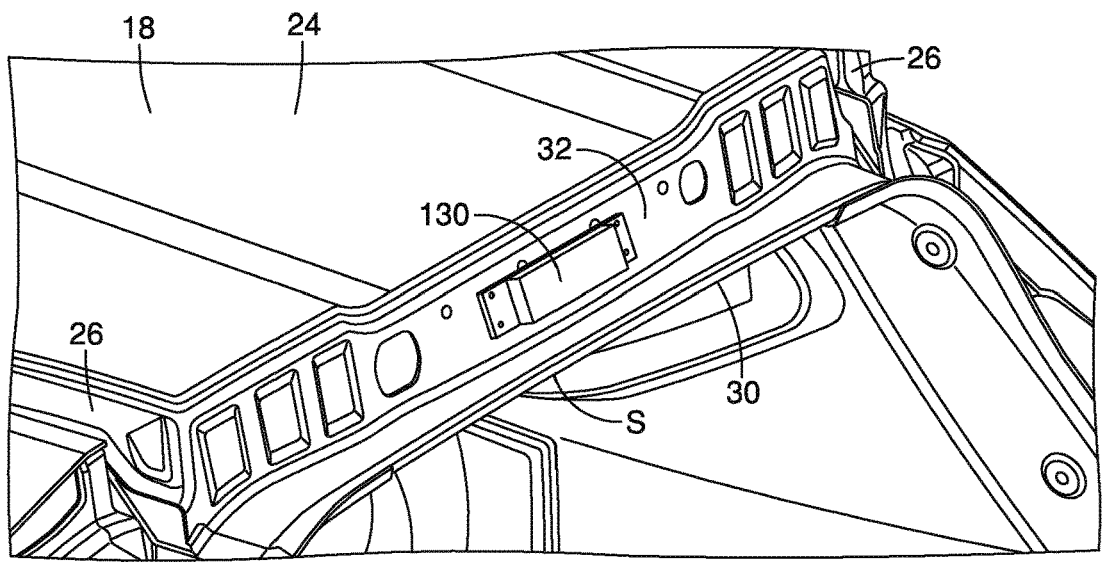
FIG. 23 is a rear perspective view of the rear of the vehicle with the rear door removed showing a door closing device or locking device installed to the roof structure along an upper portion of the gutter area above the rear door opening in accordance with the exemplary embodiment.

As shown in FIG. 23, above the rear door opening 30, the roof structure 18 can include a door retention device 130 that is configured to ensure that the upper end of the rear door 60 remains tight against the vehicle body structure 12 with the rear door 60 in the closed orientation. The door closing device 130 can be, for example, an electromagnetic device that uses electro-magnetic force to urge the rear door 60 tight against the vehicle body structure 12. Alternatively, the door closing device 130 can be an electrically actuated locking mechanism that engages and captures a locking structure not shown at the top of the rear door 60.

The vehicle 10 can include an electronic controller (not shown) that controls operation of the extender 74 and the door closing device 130 based on signals from the keyfob (not shown), the above mentions sensor and switches of the vehicle 10. The electronic controller preferably includes a microcomputer with a door opening/closing control program. The electronic controller can also include other conventional components such as an input interface circuit, an output interface circuit, and storage devices such as a ROM (Read Only Memory) device and a RAM (Random Access Memory) device.

The vehicle body structure features (other than the rear door 60 and the four-bar linkage 62) are conventional components that are well known in the art. Since such body structure features are well known in the art, these structures will not be discussed or illustrated in detail herein. Blither, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired, Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rear door assembly, comprising:
a vehicle body structure having a roof structure and a side wall that defines a wheel well structure, a rear door opening and at least one gutter on a first side of the rear door opening;
a rear door movable between a door closed orientation covering the rear door opening and the at least one gutter, and a door open orientation exposing the rear door opening and the gutter; and
a four-bar linkage assembly supporting the rear door for movement between the door open orientation and the door closed orientation, the four-bar linkage including at least a rearward member, a forward member and an extender,
the rearward member having a first end pivotally attached to the at least one gutter, a second end attached to the rear door and a protrusion spaced apart from the first end and the second end, the forward member having a first end attached to the roof structure and a second end attached to the rear door, and the extender having a lower end pivotally attached to a body panel fixed to the side wall above and adjacent to the wheel well structure and an upper end attached to the protrusion of the rearward member, wherein with the rear door in the door open orientation the rearward member and the forward member support the rear door at a location above the roof structure, and with the rear door in the door closed orientation, the rearward member and the forward member are located within the gutter and are concealed by the rear door.

2. The rear door assembly according to claim 1, wherein the side wall defines a cavity that extends from the wheel well to the gutter; and the extender is dimensioned and shaped such that with the rear door in the door open orientation at least a portion of the extender extends upward out of the cavity and with the rear door in the door closed orientation the extender is retained within the cavity.

3. The rear door assembly according to claim 2, wherein the protrusion of the rearward member is dimensioned such that with the rear door in the door closed orientation at least a portion of the protrusion extends into the cavity.

4. The rear door assembly according to claim 2 wherein the gutter defines an opening to the cavity with a flexible boot being attached to the gutter covering the opening with a top end of the extender extending through a opening in the flexible boot.

5. The rear door assembly according to claim 1, wherein the extender is a linear movement device powered by an electric motor.

6. The rear door assembly according to claim 5, wherein the extender is configured to move the rear door between the door closed orientation and the door open orientation.

7. The rear door assembly according to claim 1, wherein the roof structure defines at least one roof ditch that extends rearward to the gutter, and the first end of the forward member being attached to a portion of at least one roof ditch for pivotal movement with respect thereto.

8. A rear door assembly, comprising a vehicle body structure having a roof structure and a side wall that defines a rear door opening;

a rear door movable between a door closed orientation covering the rear door opening and a door open orientation exposing the rear door opening; and a four-bar linkage assembly supporting the rear door for movement between the door open orientation and the door closed orientation, the four-bar linkage including at least a rearward member, a support bracket and a forward member, the rearward member having a first end pivotally attached to an upright portion of the side wall and a second end attached to the rear door, the support bracket being fixed to the roof structure with a rearward end thereof being cantilevered from the roof structure and the forward member having a first end attached to the rearward end of the support bracket and a second end attached to the rear door forward and inboard relative to the rearward member, with the first end of the rearward member being outboard relative to the support bracket.

9. The rear door assembly according to claim 8, wherein the side wall of the vehicle body structure further defines a gutter located outboard and adjacent to the rear door opening such that with the rear door in the door open orientation the rearward member and the forward member support the rear door at a location above the roof structure, and with the rear door in the door closed orientation, the rearward member and the forward member are located within the gutter and are concealed by the rear door.

10. The rear door assembly according to claim 8, wherein the four-bar linkage assembly further includes at least one extender having a lower end pivotally attached to a body panel of the side wall above and adjacent to a wheel well structure and an upper end attached to a protrusion of the rearward member.

11. The rear door assembly according to claim 10, wherein the extender is a linear movement device powered by an electric motor.

12. The rear door assembly according to claim 11, wherein the extender is configured to move the rear door between the door closed orientation and the door open orientation.

13. A rear door assembly, comprising:

a vehicle body structure having a roof structure that defines at least one roof ditch structure and a side wall that defines a rear door opening;

a rear door movable between a door closed orientation covering the rear door opening, and a door open orientation exposing the rear door opening; and a four-bar linkage assembly supporting the rear door for movement between the door open orientation and the door closed orientation, the four-bar linkage including at least a first bracket, a second bracket, a forward member and a rearward member, the first bracket being installed to the roof structure within the roof ditch, the first bracket having parallel vertical protrusions with a pivot pin extending through openings at rearward ends of the protrusions and an opening at a first end of the forward member, the second bracket being fixed to the rear door with a second end of the forward member being fixed to the second bracket for pivotal movement with respect thereto, the second end of the forward member being located outboard of the second bracket, and a first end of the rearward member being fixed to the side wall at a location spaced apart from the first bracket and a second end of the rearward member being fixed to the rear door at a location spaced apart from the second bracket.

14. The rear door assembly according to claim 13, wherein the first bracket is located inboard relative to the second bracket, and the forward member has a non-linear overall shape such that the first end of the forward member is located inboard relative to the second end of the forward member.

15. A rear door assembly, comprising:

a vehicle body structure having a roof, a rear end panel and a side wall, the rear end panel defining a rear door opening and a cavity opening, the side wall defining a wheel well with a cavity being defined between panels of the side wall, the cavity extending from an upper area of the wheel well to the cavity opening defined by the rear end panel, with a first ball stud supported within the cavity to the side wall adjacent to the wheel well;

a rear door movable;

a four-bar linkage assembly supporting the rear door for movement between a door closed orientation covering the rear door opening and the cavity, and a door open orientation exposing the rear door opening and the cavity, the four-bar linkage including at least an extender and a rearward member, the extender having a lower end attached to the first ball stud, the rearward member having a projection with a second ball stud mounted thereon, an upper end of the extender attached to the second ball stud such that extensible movement of the extends causes corresponding movement of the rearward member thereby urging the rear door upward; and a flexible boot member fitted to the rear end panel covering the cavity opening, the flexible boot member having an opening that receives and upper portion of the extender.

16. The rear door assembly according to claim 15, wherein the extender is a linear movement device powered by an electric motor.

17. The rear door assembly according to claim 16, wherein the extender is configured to move the rear door between the door closed orientation and the door open orientation.

* * * * *